(12) United States Patent
Yamamoto

(10) Patent No.: US 8,175,988 B2
(45) Date of Patent: May 8, 2012

(54) INFORMATION PROCESSING APPARATUS, INFORMATION PROCESSING METHOD, AND PROGRAM

(75) Inventor: Noriyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 898 days.

(21) Appl. No.: 12/140,013

(22) Filed: Jun. 16, 2008

(65) Prior Publication Data

US 2009/0006288 A1    Jan. 1, 2009

(30) Foreign Application Priority Data

Jun. 26, 2007 (JP) ................................ P2007-167243

(51) Int. Cl.
*G06F 15/18* (2006.01)
(52) U.S. Cl. ........................................................ 706/14
(58) Field of Classification Search .................. None
See application file for complete search history.

(56) References Cited

U.S. PATENT DOCUMENTS

| 7,577,645 | B2 * | 8/2009 | Yamamoto et al. ............... 1/1 |
| 2002/0116710 | A1 | 8/2002 | Schaffer et al. |
| 2006/0129547 | A1 * | 6/2006 | Yamamoto et al. ............ 707/5 |
| 2006/0170945 | A1 * | 8/2006 | Bill ............................ 358/1.13 |
| 2006/0248091 | A1 * | 11/2006 | Yamamoto et al. .......... 707/100 |
| 2007/0003914 | A1 * | 1/2007 | Yang ........................... 434/236 |

FOREIGN PATENT DOCUMENTS

| JP | 2001-100888 | 4/2001 |
| JP | 2004-519902 | 7/2004 |
| JP | 2005-32167 | 2/2005 |
| JP | 2007-026425 | 2/2007 |

OTHER PUBLICATIONS

S. Tsuge et al., "Relevance Feedback Using Support Vector Machine for Information Retrieval", Department of Information Science & Intelligent System. Jan. 2001, vol. 2001, No. 9, pp. 83-89. www.ipsj.or.jp.

H. Takamura et al., "Feature Space Restructuring for SVMs with Application to Text Categorization", Nara Institute of Science and Technology, May 2001, vol. 2001, No. 54, pp. 17-25. www.ipsj.or.jp.

K. Oku et al., "A Proposal of Context-Aware Ranking Method for Information Recommendation", Nara Institute of Science and Technology, Jul. 2007, vol. 107 No. 131, pp. 121-127. www.ieice.org.

* cited by examiner

*Primary Examiner* — Kakali Chaki
*Assistant Examiner* — Peter Coughlan
(74) *Attorney, Agent, or Firm* — Finnegan, Henderson, Farabow, Garrett & Dunner, L.L.P.

(57) ABSTRACT

An information processing apparatus learning a preference of a user for a content item includes acquiring means for acquiring an operation or expression of the user for a certain content item as feedback information; training data generating means for generating training data for the preference learning from the feedback information acquired by the acquiring means; and learning means for learning the preference of the user and how to attach a meaning to the feedback information in association with the training data by using multiple pieces of training data generated by the training data generating means.

7 Claims, 6 Drawing Sheets

| IMPLICIT FEEDBACK INFORMATION (IFB) | |
|---|---|
| DEVICE OPERATION INFORMATION | PLAYBACK, STOP, SKIP, FAST-FORWARD, REWIND, RECORDING, CLEAR, DETAILED INFORMATION CONFIRMATION, VOLUME UP/DOWN, CHANNEL SWITCHING, KEYBOARD INPUT, MOUSE OPERATION |
| USER EXPRESSION INFORMATION | EXPRESSION OF FEELING/STATE BY FACE/MOTION/SPEECH: LAUGHING, CRYING, ANGER, IRRITATION, BEMUSEMENT, AMBIVALENCE, QUESTION, CONCENTRATION, DISTRACTION, EXCITEMENT, EMOTION, SLEEPINESS, WEARINESS, FATIGUE |
| | EXAMPLES OF EXPRESSION TO BE DETECTED IN ASSOCIATION WITH THE ABOVE FEELINGS/STATES: SMILE, CRYING FACE, ANGRY FACE, NERVOUS SHAKING OF LEGS, FROWN, "UM", LEAN ONE'S HEAD TO ONE SIDE, MOTIONLESS, EMPTY GAZE, PERSPIRATION, GOOSE BUMPS, DOZINESS, YAWN OR STRETCH, SQUIRMING |
| | INFORMATION DETECTED BY SENSOR (USER EXPRESSION DETECTING UNIT) → HEART RATE, AMOUNT OF SWEATING, BLINK COUNT, BRAIN BLOOD FLOW, BRAIN WAVES |

FIG. 2

| | IMPLICIT FEEDBACK INFORMATION (IFB) | |
|---|---|---|
| DEVICE OPERATION INFORMATION | PLAYBACK, STOP, SKIP, FAST-FORWARD, REWIND, RECORDING, CLEAR, DETAILED INFORMATION CONFIRMATION, VOLUME UP/DOWN, CHANNEL SWITCHING, KEYBOARD INPUT, MOUSE OPERATION | |
| USER EXPRESSION INFORMATION | EXPRESSION OF FEELING/STATE BY FACE/MOTION/SPEECH: LAUGHING, CRYING, ANGER, IRRITATION, BEMUSEMENT, AMBIVALENCE, QUESTION, CONCENTRATION, DISTRACTION, EXCITEMENT, EMOTION, SLEEPINESS, WEARINESS, FATIGUE | |
| | EXAMPLES OF EXPRESSION TO BE DETECTED IN ASSOCIATION WITH THE ABOVE FEELINGS/STATES: SMILE, CRYING FACE, ANGRY FACE, NERVOUS SHAKING OF LEGS, FROWN, "UM", LEAN ONE'S HEAD TO ONE SIDE, MOTIONLESS, EMPTY GAZE, PERSPIRATION, GOOSE BUMPS, DOZINESS, YAWN OR STRETCH, SQUIRMING | |
| | INFORMATION DETECTED BY SENSOR (USER EXPRESSION DETECTING UNIT) → | HEART RATE, AMOUNT OF SWEATING, BLINK COUNT, BRAIN BLOOD FLOW, BRAIN WAVES |

FIG. 3

| EXPLICIT FEEDBACK INFORMATION (EFB) | |
|---|---|
| | INPUT WITH LIKE/DISLIKE BUTTON LIKE/DISLIKE SPEECH LIKE/DISLIKE ACTION |

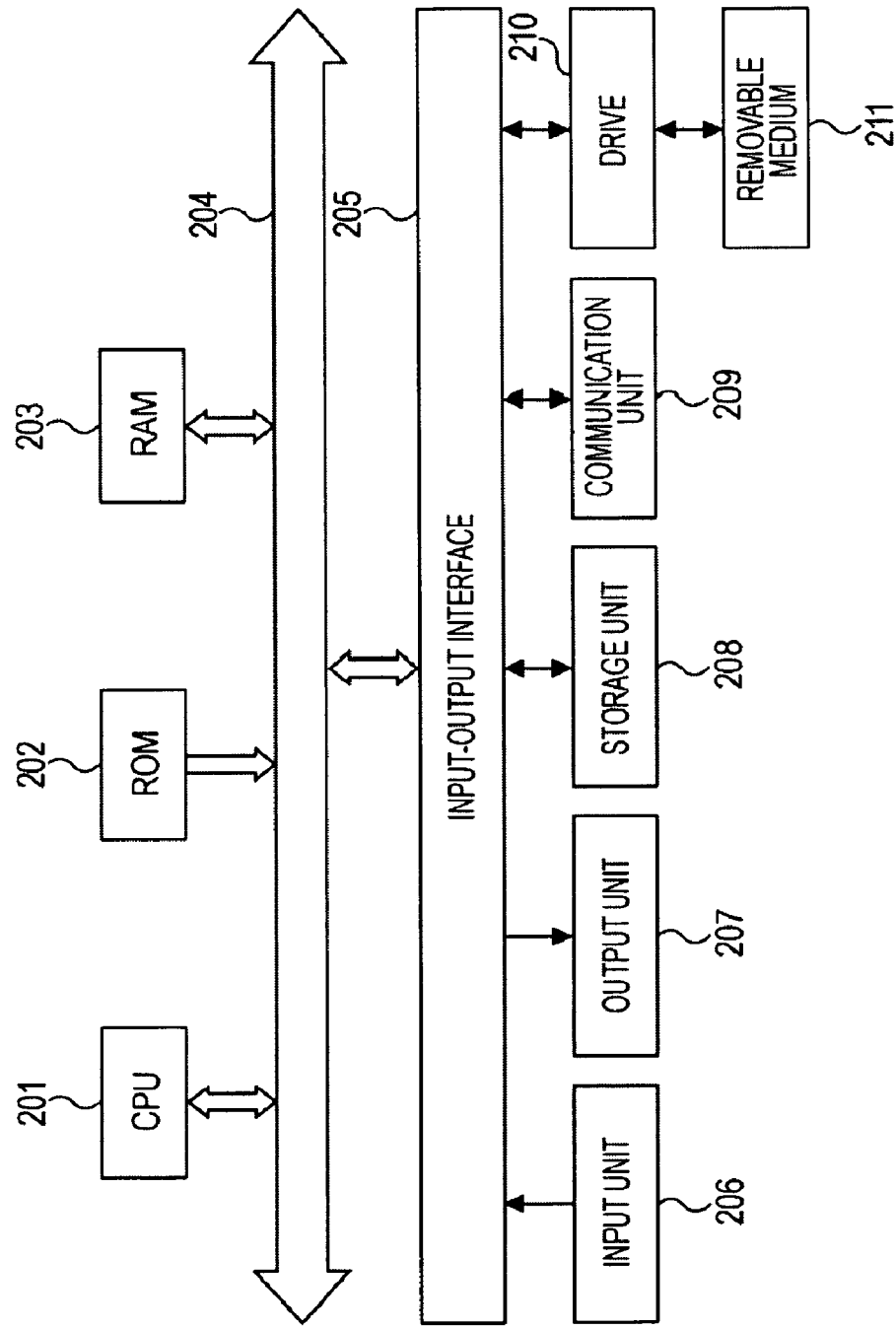

INFORMATION PROCESSING APPARATUS, INFORMATION PROCESSING METHOD, AND PROGRAM

CROSS REFERENCES TO RELATED APPLICATIONS

The present invention contains subject matter related to Japanese Patent Application JP 2007-167243 filed in the Japanese Patent Office on Jun. 26, 2007, the entire contents of which are incorporated herein by reference.

BACKGROUND OF THE INVENTION

1. Field of the Invention

The present invention relates to information processing apparatuses, information processing methods, and programs. In particular, the present invention relates to an information processing apparatus, an information processing method, and a program capable of avoiding an occurrence of a state in which the preference of a user is indeterminable in application of a method using feedback information (particularly, IFB) about content from the user to perform appropriate processing.

2. Description of the Related Art

Systems for recommending content items, such as music tunes or moving images, to users are proposed and called recommendation systems. Such recommendation systems adopt methods using explicit feedback information (hereinafter referred to as EFB) or methods using implicit feedback information (hereinafter referred to as IFB) in order to determine the preferences of the users for target content items. In the methods using the EFB, the users are directly asked about the presence of interest in the target content items. In the methods using the IFB, the presence of interest in the target content items is estimated from users' operations with devices (refer to PCT Japanese Translation Patent Publication No. 2004-519902, Japanese Unexamined Patent Application Publication No. 2005-32167, and Japanese Unexamined Patent Application Publication No. 2001-100888).

In general, the methods using the EFB have problems in the designs of user interfaces because the methods impose burdens on the users. Since frequent inputs by the users are not expected even if natural interfaces can be designed, it is not possible to collect data sufficient to learn the preference of the users. Accordingly, the methods using the IFB attract attention.

For example, as for music content, various users' operations with devices to play back the music content are adopted as the IFB. In the methods using the IFB in related art, the preference scores associated with certain users' operations with devices are acquired and the acquired preference scores are learned (stored) to determine the preferences of the users. Specifically, a preference score of +1 is acquired when a user performs a playback operation, a preference score of −1 is acquired when the user performs a fast-forward, pause, or skip operation, and a preference score of −5 is acquired when the user performs a clear operation. In addition, various operations can be scored in detail. For example, in a state in which all playback is selected, a preference score of +2 is acquired when the user performs the normal playback operation, a preference score of +3 is acquired when the user performs the playback operation after the skip operation, and a preference score of +1 is acquired when the user views related information.

SUMMARY OF THE INVENTION

However, since the preferences of users are determined on the basis of the association with fixed operations in the methods using the IFB in the related art, the following indeterminable states undesirably arise.

For example, when the pause operation is performed during the playback of content, it is not possible to determine whether the pause operation is performed because an inevitable event, such as a phone ring, by which a user is forced to pause the playback occurs despite the fact that the user likes the content or because the user dislikes the content.

When no operation is performed during the playback of content, it is not possible to determine whether no operation is performed because the user listens to the content absorbedly or because no user exists.

When the clear operation of delivered content is performed, it is not possible to determine whether the clear operation is performed because the user owns the same content or because the user dislikes the content and does not want to own it.

When the skip operation of content is performed, it is not possible to determine whether the skip operation is performed according to the user's convenience (for example, the user does not have enough time to listen to the entire content) despite the fact that the user likes the content or whether the skip operation is performed because the user dislikes the content and does not want to listen to it. In addition, it is supposed that the user tends to perform the skip operation because of his/her temperament. For example, an impatient user may perform the skip operation differently from an easy-going user. It is not possible to determine how to understand such a tendency.

Furthermore, since sufficient measures against the indeterminable states described above are not provided in the methods using the IFB in the related art, there is problems in that the preferences of users are not successfully learned.

For example, it is assumed that the indeterminable state occurs because no operation is performed during playback of content. If all the content is normally played back with no operation performed by the user, a preference score of +2 is added according to the example described above as to the music content. However, in the case in which no operation is performed because no user exists, no user listens to the music content. Accordingly, the addition of +2 as the preference score of the user does not necessarily produce a good result to learn the preference of the user unless it can be determined whether no operation is performed because the user listens to the content absorbedly or because no user exists. However, no reflection of such an indeterminable case in the determination of the preference of the user reduces the amount of training data for the learning and, therefore, does not necessarily produce a good result to learn the preference of the user.

It is desirable to avoid an occurrence of a state in which the preference of a user is indeterminable in application of a method using feedback information (particularly, the IFB) about content from the user to perform appropriate processes. The appropriate processes include recommendation of content, automatic playback, and continuation of a dialogue using the learned preference.

According to an embodiment of the present invention, an information processing apparatus learning a preference of a user for a content item includes acquiring means for acquiring an operation or expression of the user for a certain content item as feedback information; training data generating means for generating training data for the preference learning from the feedback information acquired by the acquiring means;

and learning means for learning the preference of the user and how to attach a meaning to the feedback information in association with the training data by using multiple pieces of training data generated by the training data generating means.

The training data generating means preferably classifies the feedback information into any of types at least including first feedback information and second feedback information. The first feedback information is determined to have a first level or higher at which the preference of the user for the certain content item is expressed. The second feedback information is determined to have a level lower than the first level, at which the preference of the user for the certain content item is expressed. The training data generating means preferably generates explicit training data for the first feedback information with a meaning attached to the corresponding operation or expression and generates implicit training data for the second feedback information without any meaning attached to the corresponding operation or expression. The learning means preferably creates a certain preference model by using only the explicit training data to perform initial learning of the preference. The learning means preferably learns the operation corresponding to the implicit training data or how to attach a meaning to the implicit training data by using the implicit training data as statistical information to modify the preference model in order to learn the preference of the user.

The learning means preferably recreates the preference model by using only the explicit training data if the number of the pieces of explicit training data which are newly generated by the training data generating means and to which meanings contradictory to the modified preference model are attached is greater than or equal to a certain value.

The training data generating means preferably further classifies the feedback information into the second feedback information or third feedback information. The feedback information determined to have a level at which the preference of the user for the certain content item is expressed, which is lower than the first level, and which is not lower than a second level is classified into the second feedback information. The feedback information determined to have a level at which the preferable of the user for the certain content item is expressed and which is lower than the second level is classified into the third feedback information for which no training data is generated.

An information processing method and a program according to other embodiments of the present invention are adopted in the information processing apparatus according to the embodiment of the present invention.

In the information processing method and the program according to the embodiments of the present invention, a preference of a user for a content item is learned in the following manner. An operation or expression of the user for a certain content item is acquired as feedback information, and training data for the preference learning is generated from the acquired feedback information. When multiple pieces of training data have been generated, the preference of the user and how to attach a meaning to the feedback information in association with the training data are learned by using the multiple pieces of training data.

As described above, according to the present invention, it is possible to apply a method using the feedback information (particularly the IFB) about content items from the user to learn the preference of the user. In particular, the preference learning can be realized such that an occurrence of a state in which the preference of the user is indeterminable can be avoided. As a result, it is possible to appropriately perform processes using the learned preference, such as recommendation of a content item, automatic playback, and continuation of dialogue.

BRIEF DESCRIPTION OF THE DRAWINGS

FIG. 2 shows examples of IFB used in the tune recommendation system in FIG. 1;

FIG. 3 shows examples of EFB used in the tune recommendation system in FIG. 1;

FIG. 7 is a block diagram showing an example the configuration of a personal computer adopted in at least part of the tune recommendation system.

DESCRIPTION OF THE PREFERRED EMBODIMENTS

Before describing embodiments of the present invention, the correspondence between the features of the claims and the specific elements disclosed in embodiments of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Embodiments of the present invention are targeted at content. The content broadly means an item produced by a creative action of a person. The content is exemplified by a movie, music tune, drama, literary work, picture, comic, animation, computer game, letter, graphic, color, voice, behavior, video, or any combination of them. The content is further exemplified by a program providing information concerning the above items through an electronic computer. The content including music is referred to as a tune here.

In this specification, so-called content data, i.e. data that is produced by creative actions of persons and that is made processable by devices is collectively called content. The data includes electrical signals and data stored in memories. In other words, music data composing, for example, a tune, is also referred to as content.

The present invention is applicable to a recommendation system that recommends a tune to a user when the tune is adopted as content. Such a system is hereinafter referred to as a tune recommendation system, which is described as an information processing apparatus according to an embodiment of the present invention.

Content is hereinafter appropriately referred to as a content item. In the following description, the content item means a tune.

Metadata about a content item is also used in this specification. Numerical data, such as speed, rhythm, and tempo, acquired by musical analysis (for example, twelve-tone analysis) is adopted as the metadata, in addition to text data, such as an artist name, tune name, genre, and review. The metadata is managed for every tune identification (ID).

Figure 1:
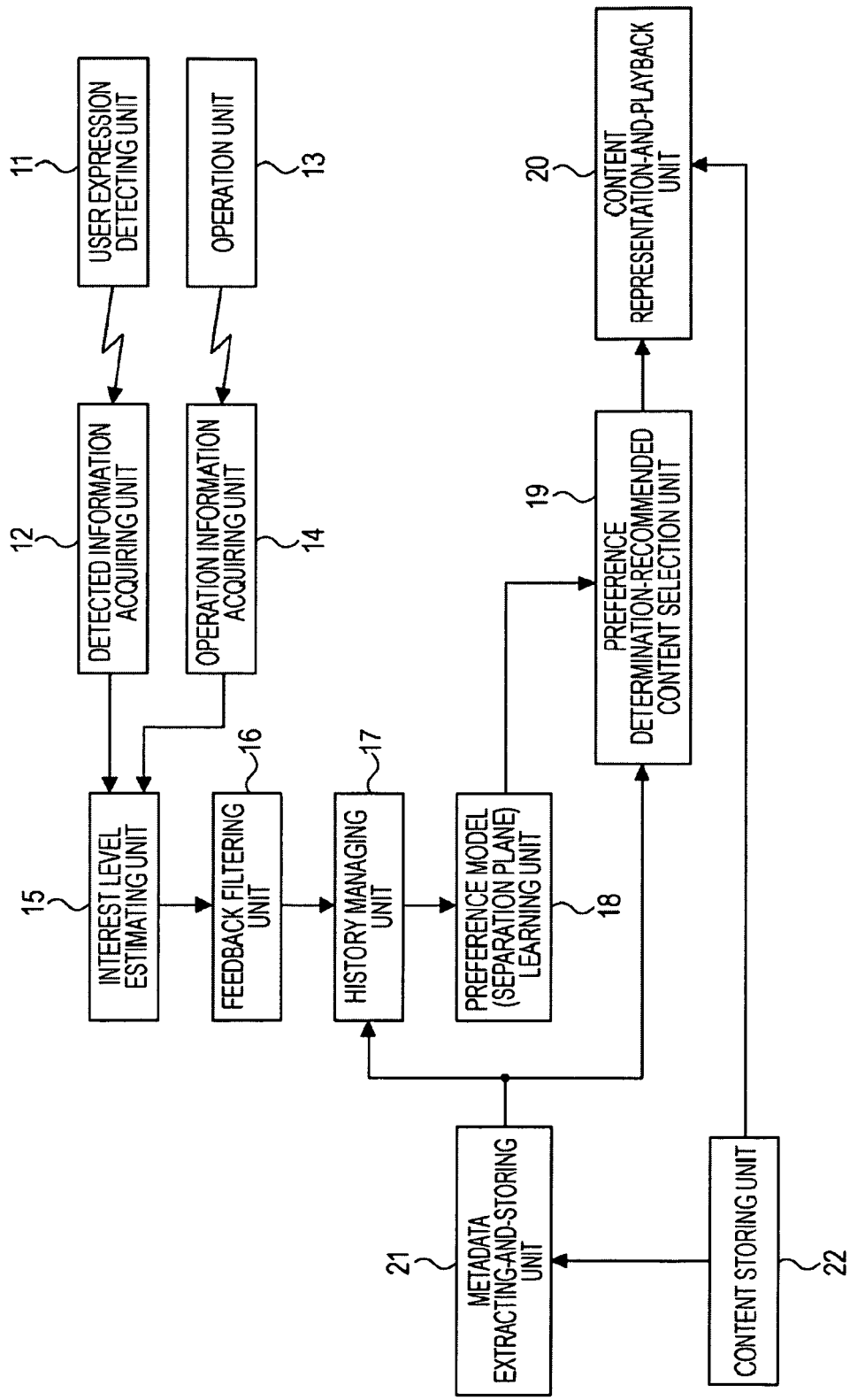
FIG. 1 is a block diagram showing an example of the functional configuration of a tune recommendation system, which is an information processing apparatus according to an embodiment of the present invention.

FIG. 1 is a block diagram showing an example of the functional configuration of a tune recommendation system.

Each functional block in the tune recommendation system in FIG. 1 may be hardware, software, or combination of them. Multiple functional blocks may be integrated into one functional block or one functional block may be divided in to multiple functional sub-blocks. In other words, the tune recommendation system in FIG. 1 may be arbitrarily configured as long as each functional block has the corresponding function.

In this specification, a system represents multiple apparatuses, an apparatus including multiple components, such as circuits, or a circuit. Accordingly, the tune recommendation system in FIG. 1 may be composed of one apparatus or may be composed of multiple apparatuses. When the tune recommendation system is composed of multiple apparatuses, information may be transferred between the apparatuses directly or over a network or the like.

The tune recommendation system in FIG. 1 includes a user expression detecting unit 11, a detected information acquiring unit 12, an operation unit 13, an operation information acquiring unit 14, an interest level estimating unit 15, a feedback filtering unit 16, a history managing unit 17, a preference model learning unit 18, a preference determination-recommended content selection unit 19, a content representation-and-playback unit 20, a metadata extracting-and-storing unit 21, and a content storing unit 22.

The user expression detecting unit 11 detects an expression of a user. The expression means a feeling or state expressed by, for example, the face, motion, or speech of the user. The detected information acquiring unit 12 processes the result detected by the user expression detecting unit 11 and supplies the processed result to the interest level estimating unit 15 as certain expression information. The expression information is processed as one piece of the IFB. Examples of the expression information are shown in FIG. 2.

In the examples in FIG. 2, the user expression detecting unit 11 detects one or more examples described after "examples of expression to be detected in association with the above feelings/states" below a broken line in the upper section of "user expression information". The detected information acquiring unit 12 acquires the expression information corresponding to the detected expression, among the examples described after "expression of feeling/state by face/motion/speech" above the broken line in the upper section of the "user expression information", and supplies the acquired expression information to the interest level estimating unit 15.

Specifically, for example, when the user smiles, the user expression detecting unit 11 detects the "smile" of the user. The detected information acquiring unit 12 acquires the "smile" as the expression information and supplies the expression information to the interest level estimating unit 15.

For example, when the user expression detecting unit 11 outputs any measurement value, the detected information acquiring unit 12 may directly acquire the expression information from a variation in the measurement value output from the user expression detecting unit 11 and may supply the expression information to the interest level estimating unit 15.

For example, when the detected information acquiring unit 12 stores a threshold value for the variation in the measurement value output from the user expression detecting unit 11, the detected information acquiring unit 12 may identify a certain expression if the variation in the measurement value output from the user expression detecting unit 11 is higher than the threshold value and may supply the certain expression information to the interest level estimating unit 15.

For example, it is assumed that the user expression detecting unit 11 includes a heart beat sensor. In this case, the heart rate output from the heart beat sensor for every period is used as one measurement value output from the user expression detecting unit 11. The detected information acquiring unit 12 may store an increase in the heart rate by one per 10 seconds as the threshold value and may measure a variation in the heart rate. If the heart rate increases by one or more per 10 seconds, the detected information acquiring unit 12 may identify the "heart rate" as the expression information and may supply the expression information to the interest level estimating unit 15. The threshold value may be based on moving average.

It is sufficient for the "heart rate" identified as the expression information to be information based on the heart rates at one or more timings. For example, the heart rate at a certain timing, for example, at a time when the heart rate increases for the first time, may be adopted as the expression information. Alternatively, a value calculated on the basis of the heart rates at multiple timings, for example, the average of the heart rates at the timings may be adopted as the expression information.

Examples of the expression information identified on the basis of the measurement values output from the user expression detecting unit 11 (information from the sensor) are shown in the lower section of the "user expression information" in FIG. 2. Specifically, the "amount of sweating", "blink count", "brain blood flow", or "brain waves" may be adopted as the expression information, in addition to the "heart rate".

The operation unit 13 includes a remote controller and a mouse. The user can use the operation unit 13 to perform various operations for various items. The operation information acquiring unit 14 acquires the operation by the user with the operation unit 13 as device operation information and supplies the acquired device operation information to the interest level estimating unit 15 as one piece of the IFB. Examples of the device operation information are shown in FIG. 2.

The user can perform an initial registration operation or can press a "like" or "dislike" button with the operation unit 13 to explicitly indicate the user's intention. Such an explicit indication of the user's intention is acquired by the operation information acquiring unit 14 as one piece of the EFB and is supplied to the interest level estimating unit 15. Examples of the EFB are shown in FIG. 3.

In the examples in FIG. 3, "like/dislike speech" and "like/dislike action" are also shown as the EFB, in addition to the "input with like/dislike button". This is because different kinds of EFB can be acquired depending on how the operation unit 13 is embodied. The user can not only perform the instruction operation with the button but also perform the instruction operation by speech and action along with the increasing technological progress in recent years. Accordingly, the operation unit 13 is differently embodied in accordance with how the user performs the instruction operation and, therefore, the different kinds of EFB can be acquired.

The interest level estimating unit 15, the feedback filtering unit 16, and the history managing unit 17 perform, for example, a feedback registration process described below with reference to FIG. 4. The history managing unit 17 and the preference model learning unit 18 perform, for example, a process of learning a preference model described below with reference to FIG. 5. The functions of the interest level estimating unit 15, the feedback filtering unit 16, the history managing unit 17, and the preference model learning unit 18 are described in detail below in the description of the feedback registration process with reference to FIG. 4 and the process of learning a preference model with reference to FIG. 5.

Figure 4:
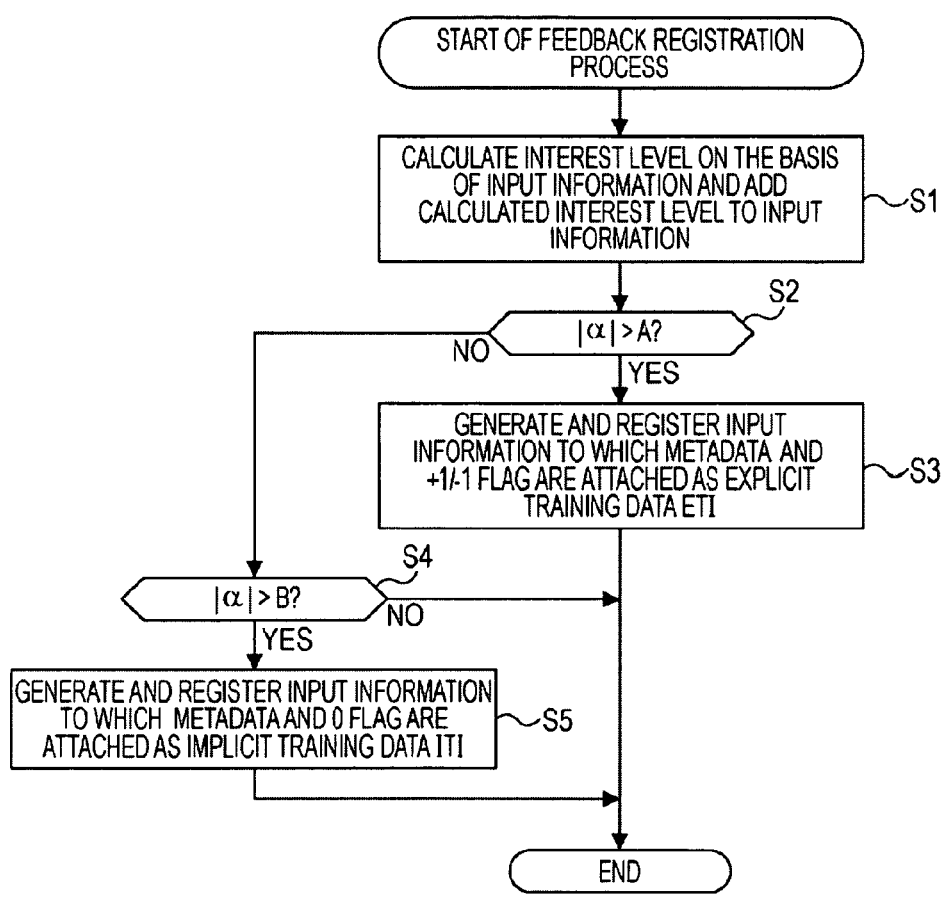
FIG. 4 is a flowchart showing an example of a feedback registration process in the tune recommendation system in FIG. 1.
Figure 5:
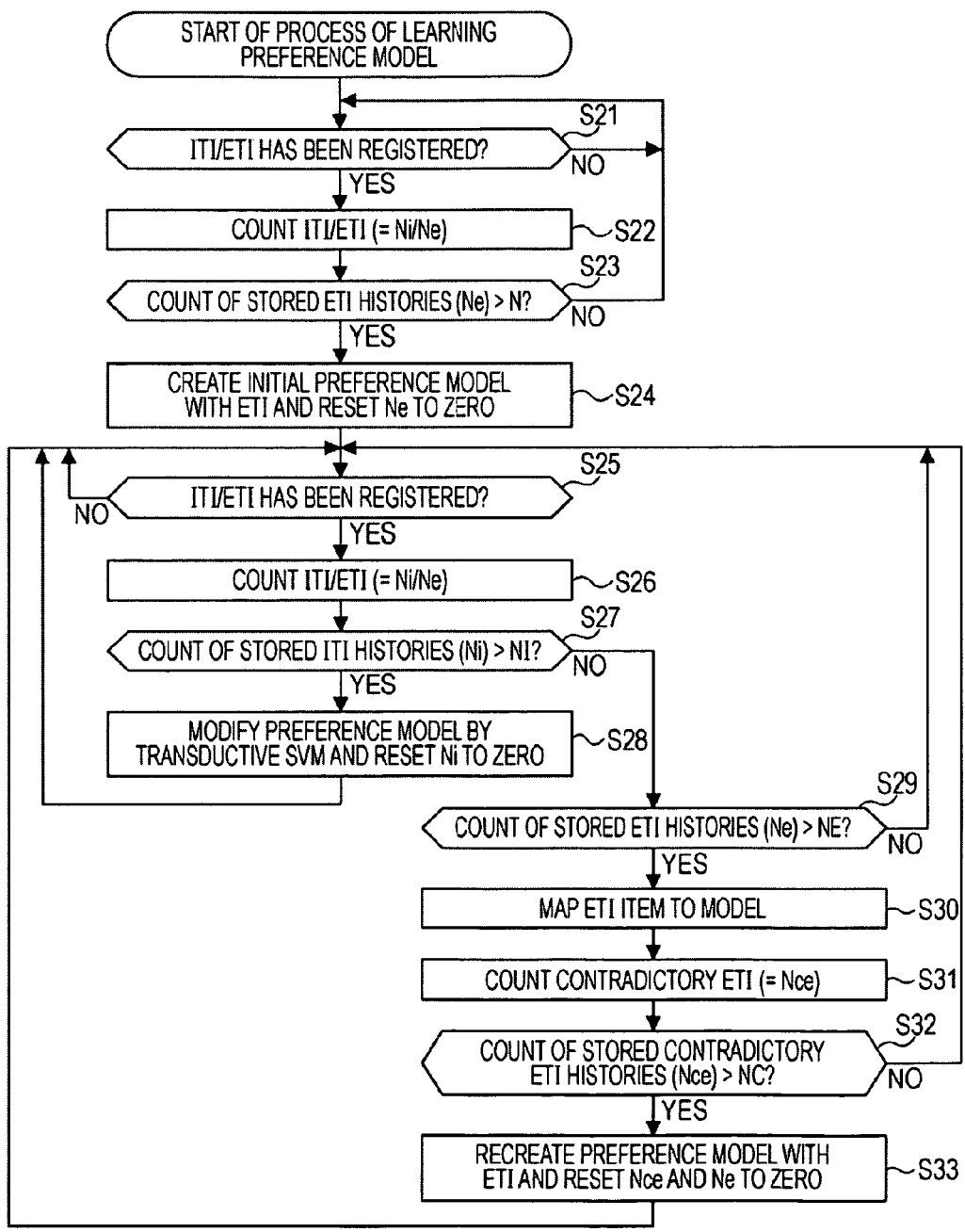
FIG. 5 is a flowchart showing an example of a process of learning a preference model in the tune recommendation system in FIG. 1.

Although described in detail below, the feedback registration process shown in FIG. 4 and the process of learning a preference model shown in FIG. 5 are repeatedly performed to create and update a preference model of the user.

The preference determination-recommended content selection unit 19 uses the preference model to determine the preference of the user and to select a recommended content item and indicates the selected recommended content item to the content representation-and-playback unit 20. The content representation-and-playback unit 20 presents or plays back the indicated recommended content item in the content items stored in the content storing unit 22.

The content storing unit 22 includes multiple content items associated with the metadata. The metadata extracting-and-storing unit 21 extracts metadata from the content storing unit 22 and stores the extracted metadata. The metadata extracting-and-storing unit 21 supplies the metadata to the history managing unit 17 or the preference determination-recommended content selection unit 19, as needed.

FIG. 4 is a flowchart showing an example of the feedback registration process.

Registration of history information used as training data in the process of learning a preference model described below with reference to FIG. 5 is performed in the feedback registration process. The feedback registration process is mainly performed by the interest level estimating unit 15, the feedback filtering unit 16, and the history managing unit 17, as described above.

Upon reception of information from the detected information acquiring unit 12 or the operation information acquiring unit 14 by the interest level estimating unit 15, the feedback registration process is started.

Referring to FIG. 4, in Step S1, the interest level estimating unit 15 acquires integrated information of the information supplied from the detected information acquiring unit 12 and the operation information acquiring unit 14, that is, integrated information of the IFB in FIG. 2 and the EFB in FIG. 3 as input information. The interest level estimating unit 15 calculates an interest level $\alpha$ on the basis of the input information and attaches the calculated interest level $\alpha$ to the input information.

The interest level $\alpha$ will now be described. The input information supplied from the detected information acquiring unit 12 and the operation information acquiring unit 14 is acquired on the basis of an action, such as an expression or operation, of the user for a certain content item. The user has any interest in the certain content item (including a case in which the user has no interest in the certain content item) and tends to behave in accordance with the level of interest. The estimated level of interest is the interest level $\alpha$, which is calculated from the input information supplied from the detected information acquiring unit 12 and the operation information acquiring unit 14 according to the embodiment of the present invention.

For example, examples of the expression information supplied from the detected information acquiring unit 12 to the interest level estimating unit 15 if the variation in the measurement value output from the user expression detecting unit 11 is higher than the threshold value are shown in the lower section of the "user expression information" in FIG. 2. It is supposed that the variation in the measurement value output from the user expression detecting unit 11 is higher than the threshold value and, as a result, the expression information shown in FIG. 2 is acquired because the user has any interest in the certain content item. In other words, the presence of such expression information assures that the user has any interest in the certain content item. Accordingly, the interest level $\alpha$ having an absolute value higher than zero is calculated for the expression information. A value corresponding to the difference between the interest level $\alpha$ and the threshold value may be added to the interest level $\alpha$ as an specific value of the interest level $\alpha$.

The interest level $\alpha$ having a plus (+) sign indicates that the user "likes" the certain content item. In contrast, the interest level $\alpha$ having a minus (−) sign indicates that the user "dislikes" the certain content item. As the absolute value of the interest level $\alpha$ increases, the user's intention, "like" or "dislike", to the certain content item becomes more explicit. As the absolute value of the interest level $\alpha$ decreases, the user's intention, "like" or "dislike", to the certain content item is hardly expressed or the user expresses no action to the certain content item.

Although described in detail below, the input information supplied from the detected information acquiring unit 12 and the operation information acquiring unit 14 concerns the certain content item which the user has experienced. Accordingly, the input information can be used as training data in the process of learning a preference model described below with reference to FIG. 5.

The pieces of training data are classified into explicit training data ETI and implicit training data ITI. The difference between the explicit training data ETI and the implicit training data ITI will be described below. It is assumed that the explicit training data ETI and the implicit training data ITI are classified in the following manner.

Only the input information in which the user's intention, "like" or "dislike", is explicitly expressed is used as the explicit training data ETI. The input information in which the user's intention is not explicitly expressed but is expressed to some extent is used as the implicit training data ITI. The input information in which the user's intention is hardly expressed is not used as the explicit training data ETI nor as the implicit training data ITI.

Under the above assumption, the feedback filtering unit 16 classifies the input information supplied from the detected information acquiring unit 12 and the operation information acquiring unit 14 into the explicit training data ETI or the implicit training data ITI on the basis of the interest level $\alpha$ estimated by the interest level estimating unit 15 or excludes the input information from the explicit training data ETI and the implicit training data ITI. In other words, the feedback filtering unit 16 performs a filtering process to the input information. Specifically, the feedback filtering unit 16 classifies the input information into a first type for the explicit training data ETI, a second type for the implicit training data ITI, or a third type, which is not used as the training data.

The filtering method is not restricted to a specific type. For example, all the IFB may be simply classified into the second type for the implicit training data ITI and all the EFB may be simply classified into the first type for the explicit training data ETI.

However, since the interest level α is attached to the input information according to the embodiment of the present invention, the filtering method based on the interest level α is adopted. Specifically, the input information having the absolute value of the interest level α, which is not higher than a threshold value B, is classified into the third type (is not classified into the first type for the explicit training data ETI nor into the second type for the implicit training data ITI). The input information having the absolute value of the interest level α, which is higher than the threshold value B and is not higher than a threshold value A, is classified into the second type for the implicit training data ITI. The input information having the absolute value of the interest level α, which is higher than the threshold value A, is classified into the first type for the explicit training data ETI.

Exemplary steps performed when the above method is adopted are shown as Steps S2 to S5 in FIG. 4.

In Step S2, the feedback filtering unit 16 determines whether the absolute value of the interest level α of the input information is higher than the threshold value A.

When the absolute value of the interest level α of the input information is higher than the threshold value A, the input information is classified into the first type for the explicit training data ETI, as described above. Accordingly, in such a case, the determination in Step S2 is affirmative and the process goes to Step S3. In Step S3, the history managing unit 17 generates and registers the input information to which the metadata about the corresponding content item (the certain content item for which the user expresses any behavior when the input information is acquired) and a +1 or −1 flag are attached as the explicit training data ETI. Then, the feedback registration process is terminated.

The +1 and −1 flags will be described in detail below in the process of learning a preference model with reference to FIG. 5. Simply, the attachment of the +1 flag attaches a meaning in that the operation is performed or the expression is given because the user "likes" the corresponding content item to the input information. The attachment of the −1 flag attaches a meaning in that the operation is performed or the expression is given because the user "dislikes" the corresponding content item to the input information.

When the absolute value of the interest level α of the input information is not higher than the threshold value A, the input information is at least not classified into the first type for the explicit training data ETI, as described above. Accordingly, in such a case, the determination in Step S2 is negative and the process goes to Step S4.

In Step S4, the feedback filtering unit 16 determines whether the absolute value of the interest level α of the input information is higher than the threshold value B.

When the absolute value of the interest level α of the input information is not higher than the threshold value A and is higher than the threshold value B, the input information is classified into the second type for the implicit training data ITI, as described above. Accordingly, in such a case, the determination in Step S4 is affirmative and the process goes to Step S5. In Step S5, the history managing unit 17 generates and registers the input information to which the metadata about the corresponding content item (the certain content item for which the user expresses any behavior when the input information is acquired) and a 0 flag are attached as the implicit training data ITI. Then, the feedback registration process is terminated.

The 0 flag will be described in detail below in the process of learning a preference model with reference to FIG. 5. Simply, the attachment of the 0 flag attaches no meaning of the corresponding operation or expression to the input information, that is, means that the attached meaning is discarded.

When the absolute value of the interest level α of the input information is not higher than the threshold value B, the user is not interested in the certain content item based on the input information, that is, the input information is classified into the third type, which is not used for the explicit training data ETI nor for the implicit training data ITI. In other words, no training data is generated for the input information and the input information can be discarded.

Accordingly, in such a case, the determination in Step S4 is negative and the feedback registration process is terminated. In other words, the feedback registration process is terminated without registering the explicit training data ETI and the implicit training data ITI.

The feedback registration process in FIG. 4 will now be described in detail with examples.

For example, if the "like" or "dislike" button in the operation unit 13 is pressed as a user's evaluation of a certain content item, the "input with like/dislike button" shown in FIG. 3 is supplied to the interest level estimating unit 15 as the EFB. In this case, in Step S1, an interest level α of +1.0 is added to the EFB indicating the "input with like button" and an interest level α of −1.0 is added to the EFB indicating the "input with dislike button".

For example, if an audio recognition sensor in the operation unit 13 recognizes a speech representing the "like" or "dislike" as the user's evaluation of a certain content item, the "like/dislike speech" shown in FIG. 3 is supplied to the interest level estimating unit 15 as the EFB. In this case, in Step S1, an interest level α of +0.9 is added to the EFB indicating the speech representing the "like" and an interest level α of −0.9 is added to the EFB indicating the speech representing the "dislike".

The examples in FIG. 3 are only exemplified and other speeches may be used as the EFB. The interest level α corresponding to the content of each speech may be added to the EFB. Specifically, an interest level α of +0.8 may be added to the EFB indicating a speech representing "fine" and an interest level α of −0.8 may be added to the EFB indicating a speech representing "dull".

For example, if a playback or skip button in the operation unit 13 is pressed during playback of a certain content item, the "playback" or "skip" shown in FIG. 2 is supplied to the interest level estimating unit 15 as the IFB. In this case, in Step S1, an interest level α of +0.5 is added to the IFB indicating the "playback" and an interest level α of −0.5 is added to the IFB indicating the "skip".

For example, if any expression shown below the broken line in the upper section of the "user expression information" in FIG. 2 is detected by the user expression detecting unit 11 during playback of a certain content item, the "concentration" or "distraction" is acquired from the detected expression as IFB, and the IFB is supplied to the interest level estimating unit 15, then in Step S1, an interest level α of +0.2 is added to the IFB indicating the "concentration" and an interest level α of −0.2 is added to the IFB indicating the "distraction".

For example, if no expression is detected by the user expression detecting unit 11 (the user does not express anything) or an expression indicating, for example, that the user sits on a sofa or scratches his/her head is detected by the user expression detecting unit 11, an interest level α of 0 is added to the detected expression.

It is assumed here that the threshold value A is equal to 0.7 and the threshold value B is equal to zero.

Under this conditions, when the input information (mainly the EFB) indicating the "input with like button", "input with dislike button", "like speech", "dislike speech", "fine", or "dull" is acquired for a certain content item, the determination in Step S2 is affirmative. Accordingly, in Step S3, the history managing unit 17 generates and registers the input information to which the metadata about the certain content item and the +1 or −1 flag are attached as the explicit training data ETI. As a result, the certain content item is used as one piece of the explicit training data ETI in the process of learning a preference model described below with reference to FIG. 5.

In contrast, when the input information (mainly the IFB) indicating the "playback", "skip", "concentration", or "distraction" is acquired for a certain content item, the determination in Step S2 is negative and the determination in Step S4 is affirmative. Accordingly, in Step S5, the history managing unit 17 generates and registers the input information to which the metadata about the certain content item and the 0 flag are attached as the implicit training data ITI. As a result, the certain content item is used as one piece of the implicit training data ITI in the process of learning a preference model described below with reference to FIG. 5.

Multiple pieces of input information may be acquired by the interest level estimating unit 15 for a certain content item. In this case, the interest levels $\alpha$ added to the pieces of input information may be integrated with each other to generate an integrated interest level $\alpha$ and the integrated interest level $\alpha$ may be compared with the threshold value A in Step S2 or the threshold value B in Step S4. The method of integrating the interest levels $\alpha$ is not restricted to a specific one. Various methods including a simple addition method and a weighted addition method may be used to integrate the interest levels $\alpha$.

The method of adding the flag and the values of the interest level $\alpha$, the threshold value A, and the threshold value B are not restricted to the exemplary values described above. Any method and any values may be used as long as the feedback information (the EFB or the IFB) acquired on the basis of the operation or expression of the user can be classified into the first type for the explicit training data ETI, the second type for the implicit training data ITI, or the third type that is not used as the training data (is discarded).

The explicit training data ETI is hereinafter simply referred to as "ETI" and the implicit training data ITI is hereinafter simply referred to as "ITI".

FIG. 5 is a flowchart showing an example of the process of learning a preference model.

Referring to FIG. 5, in Step S21, the preference model learning unit 18 determines whether any ITI or ETI has been registered.

The determination in Step S21 is negative unless Step S3 or S5 in the feedback registration process in FIG. 4 is performed and the process repeats Step S21.

If Step S3 or S5 in the feedback registration process in FIG. 4 is performed, that is, if any ITI or ETI has been registered, the determination in Step S21 is affirmative and the process goes to Step S22. In Step S22, the preference model learning unit 18 counts the pieces of ITI and ETI.

The count of the pieces of ITI is represented by "Ni" and is appropriately referred to as a count of stored ITI histories. The count of the pieces of ETI is represented by "Ne" and is appropriately referred to as a count of stored ETI histories.

In Step S23, the preference model learning unit 18 determines whether the count of stored ETI histories (Ne)>"N".

If the count of stored ETI histories (Ne) is not greater than N, the determination in Step S23 is negative and the process goes back to Step S21.

The loop process from Step S21 to S23 is repeated until the N pieces of ETI are stored. When the N pieces of ETI have been stored, the determination in Step S23 is affirmative and the process goes to Step S24. In Step S24, the preference model learning unit 18 creates an initial preference model with the ETI and resets "Ne" to zero.

The initial preference model of the user is created by using the N pieces of ETI in the above manner. Specifically, "N" is arbitrarily set to the integer corresponding to the number of pieces of ETI necessary to create the initial preference model, which is estimated by the designer or manufacturer.

The ETI is information concerning a certain content item whose interest level $\alpha$ is higher than the threshold value A (refer to Steps S2 and S3 in FIG. 4), among the information concerning the content items which the user has experienced, according to the embodiment of the present invention. In general, the ETI is information with which the interest in the certain content item of the user can be estimated more accurately. In other words, information that is determined to be more accurate information in the estimation of the interest in the certain content item of the user, among the feedback information (input information) such as the EFB and the IFB from the user, is classified into the ETI (more specifically, part of the components of the ETI).

In the creation of the initial preference model, uncertain information with which the interest in the certain content item of the user may not be accurately estimated is excluded from the training data and only the ETI with which the interest in the certain content item of the user can be accurately estimated is used as the training data.

However, according to the embodiment of the present invention, the feedback information (input information) such as the EFB and the IFB from the user, among the components of the ETI, is not directly used and the +1 or −1 flag and the metadata are also used to create the initial preference model. The +1 flag, the −1 flag, and 0 flag attached to the ITI are hereinafter collectively referred to as a like/dislike flag.

Specifically, a vector such as [like/dislike flag (+1 or −1), metadata] is used as the ETI in the creation of the initial preference model. Such a vector is hereinafter referred to as a metavector. The ETI (metavector) can be represented as points on a certain space (hereinafter referred to as a preference metaspace) composed of the metadata. In this case, a plane (hereinafter referred to as a separation plane) with which a "like" area is separated from a "dislike" area in the preference metaspace can be created by using the pieces of ETI (metavectors) of a number greater than the certain number N by, for example, Support Vector Machine (SVM) or linear discrimination. In other words, the separation plane in the preference metaspace is created as the initial preference model in the embodiment of the present invention.

After the initial preference model is created in the above manner, that is, after the initial separation plane is created in the preference metaspace, the preference determination-recommended content selection unit 19 in FIG. 1 can determine whether the metavector, which is generated by vectorizing a content item to be recommended (a candidate for the recommended content item) with the metadata, is arranged in the "like" area or in the "dislike" area with respect to the separation plane in the preference metaspace to determine the preference of the candidate for the recommended content item.

In this case, the preference determination-recommended content selection unit 19 selects the candidate for the recommended content item arranged in the "like" area as a recommended content item. The content representation-and-playback unit 20 presents or plays back the recommended content item. The user experiences the recommended content item and, then, is likely to perform any operation or give any expression for the recommended content item. For example, the user performs various device operations with the operation unit 13 to view, clear, or evaluate the recommended content item and gives the various expressions.

As a result, any EFB or IFB about the recommended content item can be acquired. Since the EFB or IFB can be used to estimate the level of interest in the recommended content item of the user, the feedback registration process in FIG. 4 is performed. When the ETI or ITI about the recommended content item is generated and registered, the number of the pieces of training data is incremented by one. The number of the pieces of training data, such as the ETI or the ITI, is increased by a value corresponding to the number of the recommended content items that have been presented to the user.

When a certain amount of new training data has been stored, the new training data can be used to update the separation plane in the preference metaspace, that is, the initial preference model.

Such an update process is performed in Steps S25 to S33 in FIG. 5. Before Steps S25 to S33 in FIG. 5 are described in detail, the concept of the update of the separation plane in the preference metaspace will now be described with reference to FIG. 6 in order to facilitate the understanding of the update process.

Figure 6:
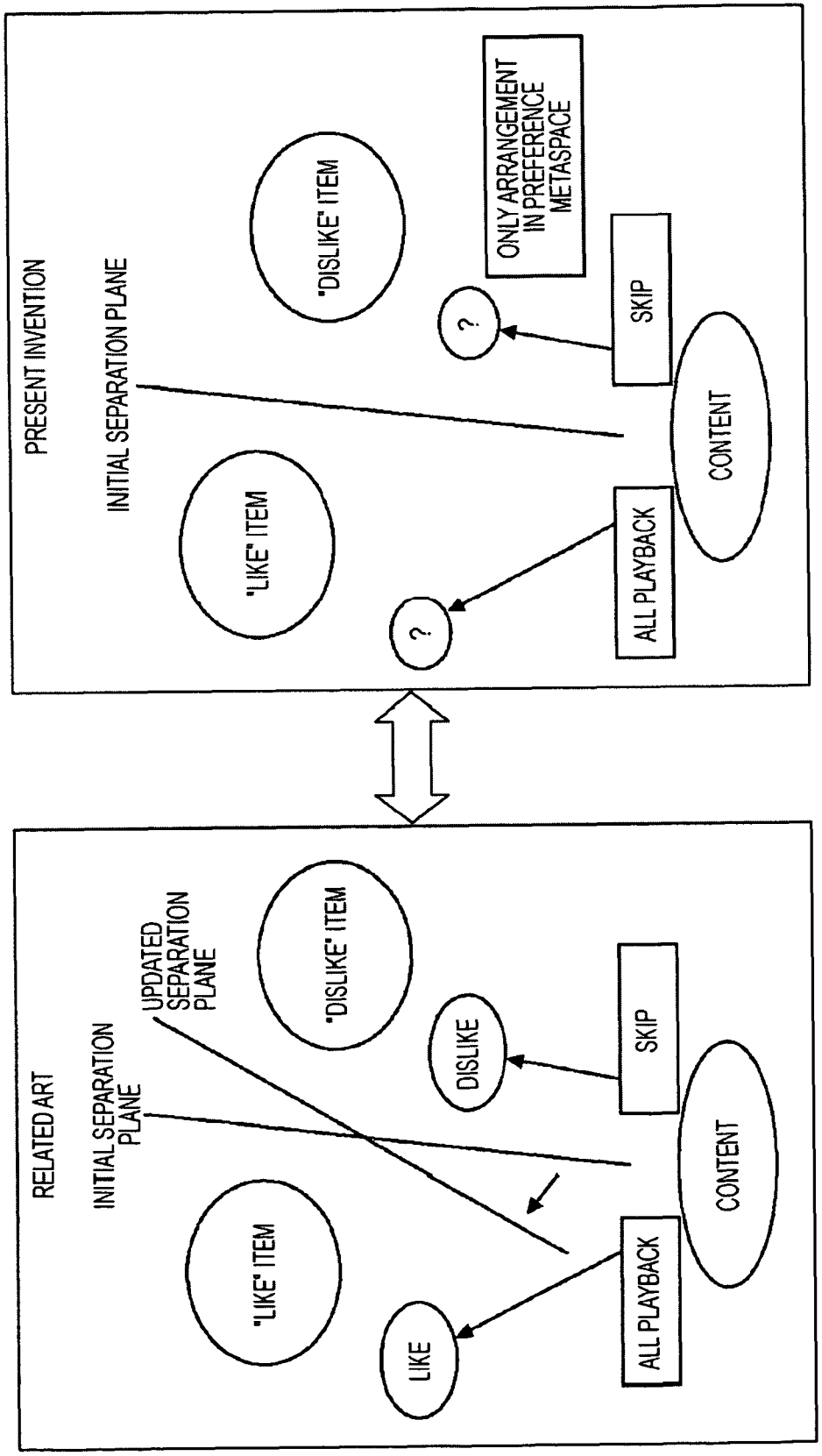
FIG. 6 shows the concept of part of the process of learning a preference model in FIG. 5, compared with an example in related art.

A left diagram in FIG. 6 illustrates how to update the separation plane in the preference metaspace in the related art. A right diagram in FIG. 6 illustrates how to update the separation plane in the preference metaspace in the embodiment of the present invention.

It is assumed, for simplicity, that information with which it can be determined whether the recommended content item that is played back is subjected to "all playback" or is "skipped" is input as the IFB. The "all playback" and "skip" input as the IFB are classified into the ITI.

In the examples in FIG. 6, in the first update, the separation plane is updated with respect to the initial separation plane. An ellipse surrounding a "like" item represents a collection of metavectors for the pieces of training data arranged in the "like" area with respect to the initial separation plane, among the N pieces of training data (the ETI in the embodiment of the present invention) used in the creation of the initial separation plane (the initial preference model). In contrast, an ellipse surrounding a "dislike" item represents a collection of metavectors for the pieces of training data arranged in the "dislike" area with respect to the initial separation plane, among the N pieces of training data (the ETI in the embodiment of the present invention) used in the creation of the initial separation plane (the initial preference model).

In the related art, the pieces of IFB, such as the "all playback" and "skip", are used with the meanings attached thereto. For example, when the recommended content item is subjected to the "all playback", the "all playback" means one certain action (certain operation or certain expression) taken by the user when the user likes the recommended content item. When the recommended content item is "skipped", the "skip" means one certain action (certain operation or certain expression) taken by the user when the user dislikes the recommended content item.

The attached "meanings" described above, that is, the directly attached "meanings" including the "like" and "dislike" are only exemplified and various other "meanings", for example, "meanings" by weighting (digitalization) can be attached.

In the related art, all the recommended content items that are subjected to the "all playback" are processed as the content items to be arranged in the "like" area while all the recommended content items that are "skipped" are processed as the content items to be arranged in the "dislike" area. The separation plane (the preference model) is updated in accordance with the metavectors of the multiple recommended content items to which the meanings are attached and the distribution state of the "like" and "dislike" content items in the preference metaspace (refer to an updated separation plane shown in the left diagram in FIG. 6).

However, it is hard to say that the attached meanings are uniformly applied to all the users or to all the recommended content items of the same user.

For example, it is hard to say that the user likes all the recommended content items because all the recommended content items are subjected to the "all playback". Specifically, if a recommended content item is subjected to the "all playback" because the user absorbedly listens to the recommended content item, it may be determined that the user likes the recommended content item. However, if no user exists, the recommended content item can be subjected to the "all playback" despite of the like or dislike of the user. In such a case, it may not be determined that the user likes the recommended content item.

Similarly, for example, it is hard to say that the user dislikes a recommended content item among multiple recommended content items because the recommended content item is "skipped". Specifically, the recommended content item can be "skipped" according to the user's convenience (for example, the user does not have enough time to listen to the recommended content item) despite the fact that the user likes the recommended content item. Or, the recommended content item can be "skipped" according to the user's temperament (for example, the user does not listen to the recommended content item until the end because the user is impatient) despite the fact that the user likes the recommended content item. Accordingly, it may not be determined that the user dislikes all the recommended content items which the user has "skipped" despite the fact that various situations can be supposed in which the user does not necessarily dislike the recommended content items.

In order to overcome the above problems, according to the embodiment of the present invention, the "meanings" attached to the "all playback" or the "skip" are discarded once when the recommended content item is subjected to the "all playback" or is "skipped" and only the arrangement of the recommended content item (metavector) in the preference space is performed. When at least a certain number of the recommended content items (metavectors) have been arranged in the preference space, the distribution state is processed as statistical information to update the separation plane (the preference model). The update process can be performed by, for example, Transductive SVM. The Transductive SVM will be described below in Step S28 in FIG. 5.

When an action (operation or expression) of the user for the recommended content item explicitly indicates the like or dislike of the user, as in the case in which the like or dislike button is pressed, the attachment of the "meaning" to the feedback information (mainly the EFB) acquired by the action in advance does not cause any problem.

For this reason, according to the embodiment of the present invention, when the feedback information (input information such as the EFB or IFB) caused by the action (operation or expression) of the user for a certain content item (recommended content item) is acquired, the feedback registration process in FIG. 4 is performed to classify the feedback information into the first type for the ETI, the second type for the ITI, or the third type, which is not used for the ETI nor ITI (which is discarded).

Specifically, the feedback information to which the "meaning" can (or should) be attached in advance is classified into the first type for the ETI. The feedback information which can be useful as the training data but to which the "meaning" cannot (or should not) be attached in advance is classified into the second type for the ITI. The feedback information that is not useful as the training data is classified into the third type.

Accordingly, when at least a certain number of pieces of ITI to which no "meaning" is attached because the "meaning" cannot (or should not) be attached to the ITI have been stored, the stored pieces of ITI are used as statistical information to update the preference model (the separation plane) according to the Transductive SVM. Specifically, Steps S25 to S33 in FIG. 5 are performed to update the preference model (the separation plane).

Referring back to FIG. 5, in Step S25, the preference model learning unit 18 determines whether any ITI or ETI has been registered.

As described above, Step S3 or Step S5 in the feedback registration process in FIG. 4 is not performed unless a new content item, such as a recommended content item, is presented or played back. Accordingly, the determination in Step S25 is negative here and the process repeats Step S25.

When a new content item, such as a recommended content item, has been presented or played back and, then, Step S3 or S5 in the feedback registration process in FIG. 4 is performed, the ITI or ETI is registered. As a result, the determination in Step S25 is affirmative and the process goes to Step S26. In Step S26, the preference model learning unit 18 counts the pieces of ITI or ETI.

In Step S27, the preference model learning unit 18 determines whether the count of stored ITI histories (Ni)>"NI".

If the count of stored ITI histories (Ni) is not greater than "NI", the determination in Step S27 is negative. If the determination in Step S29 described below is also negative, the process goes back to Step S25 again.

As long as the determination in Step S29 described below is negative, the loop process including Steps S25, S26, S27, and S29 is repeated until the NI pieces of ITI are stored. When the number of the pieces of ITI exceeds "NI", the determination in Step S27 is affirmative and the process goes to Step S28. In Step S28, the preference model learning unit 18 modifies the preference model by the Transductive SVM and resets "Ni" to zero.

The preference model of the user is updated by using the NI pieces of ITI in the above manner. Specifically, "NI" is arbitrarily set to the integer corresponding to the number of pieces of ITI necessary to update the preference model, which is estimated by the designer or manufacturer, that is, to the integer corresponding to the number of pieces of ITI necessary to use the ITI as the statistical information.

More specifically, a metavector such as [like/dislike flag (0), metadata] is used as the ITI in the modification of the preference model by the Transductive SVM. No like/dislike flag is attached to the initial metavector of the ITI.

According to the embodiment of the present invention, the like/dislike flag is used as information for the attachment of the "meaning". Accordingly, as described above, the like/dislike flag +1 or −1 is attached to the initial metavector of the ETI while the like/dislike flag 0 is attached to the initial vector of the ITI in order to indicate that the "meaning" has been discarded once.

The Transductive SVM is used in the embodiment of the present invention for this reason. In the Transductive SVM, after the metavectors (the metavectors for the ITI in the embodiment of the present invention) are mapped to the preference space including the original separation plane (the preference model) in order to appropriately attach the like/dislike flag, the separation plane is shifted so that all the metavectors (all the metavectors including not only the existing pieces of ITI but also the pieces of ETI in the embodiment of the present invention) are most apart from the separation plane.

Specifically, the Transductive SVM includes the following algorithms A to E. It is presumed that a test set is used as additional information about the margin and that reattachment of a label is permitted to maximize the margin. The label means the like/dislike flag in the embodiment of the present invention.

The algorithm A uses labeled data to build the separation plane. According to the embodiment of the present invention, the labeled data means the ETI to which the like/dislike flag +1 or −1 is attached.

The algorithm B classifies unlabeled data with respect to the current separation plane. According to the embodiment of the present invention, the unlabeled data means the NI pieces of ITI to which the like/dislike flag 0 is attached (for which the attached meaning is discarded).

The algorithm C selects a pair of a label determined to be a positive case in the algorithm B and a label determined to a negative case therein, which is sufficiently close to the separation plane. According to the embodiment of the present invention, the positive case means the "like" and the negative case means the "dislike".

The algorithm D replaces the pair of labels selected in the algorithm C with another pair. The replacement is performed only when the replacement increases the margin.

The algorithm E repeats the algorithms A to D until a termination condition is satisfied.

Refer to "T. Joachims, Transductive Inference for Text Classification using Support Vector Machines, ICML, 1999" for a detailed description of the Transductive SVM.

When the separation plane (the preference model) has been updated by the Transductive SVM including the algorithms A to E and "Ni" has been reset to zero, Step S28 in FIG. 5 is terminated and the process goes back to Step S25 to repeat the subject steps.

Steps S29 to S33 in FIG. 5 will now be described.

Each time the loop process including Steps S25 to S28 is repeated, the separation plane (the preference model) is gradually modified by the Transductive SVM using the ITI.

When the user has experienced the recommended content item, contradictory ETI about the recommended content item can be acquired due to the relationship with the modified separation plane (the preference model). Specifically, the recommended content item can be arranged in the "dislike" area with respect to the modified separation plane as the result of the mapping of the metavector of the ETI to the preference space despite the fact that the recommended content item is to be determined to be arranged in the "like" area because the ETI has the like/dislike flag +1. Conversely, the recommended content item can be arranged in the "like" area with respect to the modified separation plane as the result of the mapping of the metavector of the ETI to the preference space despite the fact that the recommended content item is to be determined to be arranged in the "dislike" area because the ETI has the like/dislike flag −1.

Since the preference of the user is apparently expressed in the ETI, it is not desirable to acquire the contradictory ETI. Accordingly, if the number Nce of contradictory pieces of ETI (hereinafter referred to as a count of stored contradictory ETI histories (Nce)) is greater than "NC", it is preferable to modify the preference model (the separation plane) again by using only the ETI.

The series of processing described above correspond to Steps S29 to S33 in FIG. 5.

Specifically, in Step S29, the preference model learning unit 18 determines whether the count of stored ETI histories (Ne)>"NE".

If the count of stored ETI histories (Ne) is not greater than "NE", the determination in Step S29 is negative and the process goes back to Step S25.

If the count of stored ETI histories (Ne) is greater than "NE", the determination in Step S29 is affirmative and the process goes to Step S30.

In Step S30, the preference model learning unit 18 maps an ETI item to the preference model. The ETI item means the metavector of the ETI described above. The mapping of the ETI item to the preference model means the mapping of the Ne ("Ne" denotes an integer exceeding "NE") metavectors of ETI to the preference metaspace.

In Step S31, the preference model learning unit 18 counts the contradictory pieces of ETI. The counted value corresponds to the count of stored contradictory ETI histories (Nce) described above.

In Step S32, the preference model learning unit 18 determines whether the count of stored contradictory ETI histories (Nce)>"NC".

If the count of stored contradictory ETI histories (Nce) is not greater than "NC", the determination in Step S32 is negative and the process goes back to Step S25.

If the count of stored contradictory ETI histories (Nce) is greater than "NC", the determination in Step S32 is affirmative and the process goes to Step S33.

In Step S33, the preference model learning unit 18 recreates the preference model with the ETI and resets "Nce" and "Ne" to zero. It is not essential to reset "Ne" to zero. However, without resetting "Ne" to zero, the count of stored ETI histories (Ne) continue to increase and the unnecessary Steps S30 and S31 are performed until the count of stored contradictory ETI histories (Nce) becomes greater than "NC".

Step S33 is basically similar to Step S24 except for the increased number of the pieces of ETI.

"NE" used in the determination in Step S29 and "NC" used in the determination in Step S32 may also arbitrarily set by the designer or manufacturer, as in the threshold values used in the other determination steps.

Although the steps in the flowchart shown in FIG. 5 are described as an example of the process of learning a preference model, the steps in FIG. 5 are only exemplified.

Another process of learning a preference model may be adopted as long as the pieces of training data classified into the ETI and the ITI are used and the meaning attached to the ITI is discarded once to perform the learning by using the ITI as statistical information. For example, the initial value of the like/dislike flag of the ITI is set to zero in order to discard the meaning attached to the ITI.

Accordingly, with all the histories stored, the recreation of the preference model with the ETI in Step S33 and the modification of the preference model by the Transductive SVM in Step S28 can be performed by using all the pieces of ETI and ITI, by using the ETI and ITI that have been added, or by using the ETI and ITI that have been acquired within a predetermined period.

The fact that the count of stored contradictory ETI histories (Nce) is greater than "NC" may be determined to be a change in the preference of the user and only the contradictory ETI may be used to recreate the preference model.

In this case, the old ETI etc. may be cleared. Alternatively, the old ETI etc. may be used as a variation of the recommendation without clearing them.

The number of the pieces of ETI may be used, instead of the number of the contradictory pieces of ETI, as a trigger of the recreation of the preference model with the ETI in Step S33. In this case, the preference model can be updated in accordance with the number of pieces of ETI to adapt to change.

The preference model (the separation plane) may be created not for all the content items but for each genre. This can realize more accurate determination of the preference. Similarly, the preference model (the separation plane) may be created for every individual if multiple users exist, for example, if a family uses the same device.

The series of processing described above may be performed by hardware or by software. If the series of processing is performed by software, the programs composing the software are installed from a program recording medium into a computer incorporated in dedicated hardware or into a general-purpose personal computer in which the preference model (the separation plane) perform various functions by installing various programs.

FIG. 7 is a block diagram showing an example the configuration of a personal computer performing the series of processing with programs. All or part of the blocks in the tune recommendation system in FIG. 1, for example, some blocks therein may be configured in the manner shown in FIG. 7.

Referring to FIG. 7, a central processing unit (CPU) 201 performs a variety of processing in accordance with programs stored in a read only memory (ROM) 202 or a storage unit 208. A random access memory (RAM) 203 appropriately stores programs executed by the CPU 201 and a variety of data. The CPU 201, the ROM 202, and the RAM 203 are connected to each other via a bus 204.

An input-output interface 205 is also connected to the CPU 201 via the bus 204. An input unit 206 including a keyboard, a mouse, and a microphone and an output unit 207 including a display device and a speaker are connected to the input-output interface 205. The CPU 201 performs the variety of processing in response to instructions supplied from the input unit 206. The CPU 201 supplies the processing result to the output unit 207.

The storage unit 208 connected to the input-output interface 205 is, for example, a hard disk. The storage unit 208 stores programs executed by the CPU 201 and a variety of data. A communication unit 209 communicates with an external apparatus over a network, such as the Internet or a local area network.

Programs may be acquired through the communication unit 209 and the acquired programs may be stored in the storage unit 208.

A drive 210 connected to the input-output interface 205 drives a removable medium 211, such as a magnetic disk, an optical disk, a magneto-optical disk, or a semiconductor memory, when loaded, to acquire programs and data recorded in the removable medium 211. The acquired programs and data are transferred to the storage unit 208, as needed, and are stored in the storage unit 208.

The program recording medium storing programs that can be executed by a computer when installed in the computer is, for example, the removable medium 211, the ROM 202 in which the programs are temporarily or permanently stored, or the hard disk composing the storage unit 208, as shown in FIG. 7. The removable medium 211 is a package medium composed of a magnetic disk (including a flexible disk), an optical disk (including a compact disc-read only memory (CD-ROM) and a digital versatile disk (DVD)), a magneto-optical disk, or a semiconductor memory. The programs are stored in the program recording medium through the communication unit 209, which is an interface, such as a router or a modem, or through a wired or wireless communication medium, such as a local area network, the Internet, or digital satellite broadcasting.

The steps describing the programs stored in the program recording medium may be performed in time series in the described sequence or may be performed in parallel or individually in the embodiments of the present invention.

Although the content item is a tune in the above description, the present invention is applicable to other content items, such as a moving image, according to the above definition.

It should be understood by those skilled in the art that various modifications, combinations, sub-combinations and alterations may occur depending on design requirements and other factors insofar as they are within the scope of the appended claims or the equivalents thereof.

What is claimed is:

1. A hardware information processing apparatus learning a preference of a user for a content item, the apparatus comprising:
    acquiring means for acquiring an operation or expression of the user for a certain content item as feedback information;
    training data generating means for generating training data for the preference learning from the feedback information acquired by the acquiring means; and
    learning means for learning the preference of the user and how to attach a meaning to the feedback information in association with the training data by using multiple pieces of training data generated by the training data generating means,
    wherein the training data generating means:
        calculates an interest level based on the feedback information acquired by the acquiring means; and
        classifies the feedback information into any of types at least including first feedback information and second feedback information, the first feedback information being determined to have the interest level equal or higher than a first level at which the preference of the user for the certain content item is expressed, the second feedback information being determined to have the interest level lower than the first level.

2. The hardware information processing apparatus according to claim 1,
    wherein the training data generating means generates explicit training data for the first feedback information with a meaning attached to the corresponding operation or expression and generates implicit training data for the second feedback information without any meaning attached to the corresponding operation or expression,
    wherein the learning means creates a certain preference model by using only the explicit training data to perform initial learning of the preference, and
    wherein the learning means learns the operation corresponding to the implicit training data or how to attach a meaning to the implicit training data by using the implicit training data as statistical information to modify the preference model in order to learn the preference of the user.

3. The hardware information processing apparatus according to claim 2,
    wherein the learning means recreates the preference model by using only the explicit training data if the number of the pieces of explicit training data which are newly generated by the training data generating means and to which meanings contradictory to the modified preference model are attached is greater than or equal to a certain value.

4. The hardware information processing apparatus according to claim 2,
    wherein the training data generating means further classifies the feedback information into the second feedback information or third feedback information, the feedback information determined to have the interest level lower than the first level, but not lower than a second level being classified into the second feedback information, the feedback information determined to have the interest level lower than the second level being classified into the third feedback information for which no training data is generated.

5. An information processing method in an information processing apparatus learning a preference of a user for a content item, the method comprising the steps of:
    acquiring an operation or expression of the user for a certain content item as feedback information;
    generating training data for the preference learning from the acquired feedback information;
    calculating an interest level based on the feedback information acquired by the acquiring means;
    classifying the feedback information into any of types at least including first feedback information and second feedback information, the first feedback information being determined to have the interest level equal or higher than a first level at which the preference of the user for the certain content item is expressed, the second feedback information being determined to have the interest level lower than the first level; and
    learning the preference of the user and how to attach a meaning to the feedback information in association with the training data by using multiple pieces of training data that are generated.

6. A computer readable medium encoded with a program causing a computer learning a preference of a user for a content item to perform a control process comprising the steps of:
    acquiring an operation or expression of the user for a certain content item as feedback information;
    generating training data for the preference learning from the acquired feedback information;
    calculating an interest level based on the feedback information acquired by the acquiring means;
    classifying the feedback information into any of types at least including first feedback information and second feedback information, the first feedback information being determined to have the interest level equal or higher than a first level at which the preference of the user for the certain content item is expressed, the second feedback information being determined to have the interest level lower than the first level; and
    learning the preference of the user and how to attach a meaning to the feedback information in association with the training data by using multiple pieces of training data that are generated.

7. A hardware information processing apparatus learning a preference of a user for a content item, the apparatus comprising:

a acquiring unit that acquires an operation or expression of the user for a certain content item as feedback information;

a training data generating unit that generates training data for the preference learning from the feedback information acquired by the acquiring unit; and a learning unit that learns the preference of the user and how to attach a meaning to the feedback information in association with the training data by using multiple pieces of training data generated by the training data generating unit, wherein the training data generating unit:

calculates an interest level based on the feedback information acquired by the acquiring means; and classifies the feedback information into any of types at least including first feedback information and second feedback information, the first feedback information being determined to have the interest level equal or higher than a first level at which the preference of the user for the certain content item is expressed, the second feedback information being determined to have the interest level lower than the first level.

* * * * *